(12) United States Patent
Kouya et al.

(10) Patent No.: US 12,516,729 B2
(45) Date of Patent: Jan. 6, 2026

(54) POWER TRANSMISSION DEVICE

(71) Applicants: JATCO LTD, Fuij (JP); Nissan Motor Co., Ltd., Yokohama (JP)

(72) Inventors: Masahiro Kouya, Kanagawa (JP); Takeshi Katou, Kanagawa (JP); Tomoya Otaki, Kanagawa (JP)

(73) Assignees: JATCO LTD, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/846,954

(22) PCT Filed: Mar. 23, 2023

(86) PCT No.: PCT/JP2023/011612
§ 371 (c)(1),
(2) Date: Sep. 13, 2024

(87) PCT Pub. No.: WO2023/182449
PCT Pub. Date: Sep. 28, 2023

(65) Prior Publication Data
US 2025/0224032 A1  Jul. 10, 2025

(30) Foreign Application Priority Data

Mar. 23, 2022 (JP) .................................. 2022-047608

(51) Int. Cl.
  *F16H 59/72* (2006.01)
  *F16H 57/029* (2012.01)
  *F16H 57/031* (2012.01)
  *F16H 57/02* (2012.01)

(52) U.S. Cl.
  CPC ........... *F16H 59/72* (2013.01); *F16H 57/029* (2013.01); *F16H 57/031* (2013.01); *F16H 2057/02026* (2013.01)

(58) Field of Classification Search
  CPC ...... F16H 59/72; F16H 57/029; F16H 57/031; F16H 2057/02026; F16H 2057/02034
  See application file for complete search history.

(56) References Cited

U.S. PATENT DOCUMENTS 5,662,007 A * 9/1997 Starker .................... F16H 57/04
                                                     74/606 R
2022/0349469 A1  11/2022 Yukawa et al.

FOREIGN PATENT DOCUMENTS

| DE | 202020107515 U1 * | 1/2021 | ........... H01B 17/583 |
| JP | H09-145487 A | 6/1997 | |
| JP | 2002327832 A * | 11/2002 | .............. G01P 1/026 |
| JP | 2016-223452 A | 12/2016 | |
| JP | 2018-103977 A | 7/2018 | |
| JP | 2018-179253 A | 11/2018 | |

(Continued)

Primary Examiner — Thomas C Diaz
(74) Attorney, Agent, or Firm — Global IP Counselors, LLP

(57) ABSTRACT

A power transmission device includes a power transmission mechanism having a plurality of rotating elements, a case that houses the power transmission mechanism, a sensor disposed at a bottom of the case, and an electrical wire that electrically connects the sensor and a connector section. As viewed from a direction of an axis of rotation of the power transmission mechanism, the electrical wire is routed to pass between the plurality of rotating elements to a top of the case, with the connector section being disposed at the top of the case.

8 Claims, 9 Drawing Sheets

(56) References Cited

FOREIGN PATENT DOCUMENTS

| | | |
|---|---|---|
| JP | 2019-065885 A | 4/2019 |
| WO | WO-9427067 A1 * 11/1994 | ......... F16H 61/0006 |
| WO | 2021/015205 A1 | 1/2021 |

\* cited by examiner

POWER TRANSMISSION DEVICE

CROSS-REFERENCE TO RELATED APPLICATIONS

This application is a U.S. national stage application of International Application No. PCT/JP2023/011612, filed on Mar. 23, 2023. This application also claims priority to Japanese Patent Application No. 2022-047608, filed on Mar. 23, 2022.

BACKGROUND

Technical Field

The present invention relates to a power transmission device.

Background Information

Japanese Patent Laid-Open Publication No. Hei 9-145487 discloses an oil temperature detecting device fitting structure for an automatic transmission in a vehicle.

SUMMARY

Japanese Patent Laid-Open Publication No. Hei 9-145487 discloses tan oil temperature sensor (sensor) disposed in the dead space between a strainer and an oil pan.

The oil temperature sensor has an electrical wire for outputting a detection signal of the oil temperature sensor. A connector section for connecting to another terminal is provided at the end of the electrical wire.

When the oil temperature sensor is arranged inside the case, the oil temperature sensor must be submerged in the oil collected inside the case. On the other hand, the connector section must be connected to another terminal in a position inside the case not submerged in the collected oil.

Therefore, when the oil temperature sensor is attached to the strainer, depending on the layout (routing) of the wiring extending from the oil temperature sensor, the case may increase in size.

Thus, there is a need to arrange the sensor without increasing the size of the case.

One aspect of the present disclosure is a power transmission device comprising a power transmission mechanism having a plurality of rotating elements, a case that houses the power transmission mechanism, a sensor disposed at the bottom of the case, and an electrical wire that electrically connects the sensor and a connector section, wherein, as viewed from the direction of the axis of rotation of the power transmission mechanism, the electrical wire is routed to pass between the plurality of rotating elements to the top of the case, disposing the connector section at the top of the case.

According to an aspect of the present disclosure, the sensor can be arranged without increasing the size of the case.

BRIEF DESCRIPTION OF THE DRAWINGS

Referring now to the attached drawings which form a part of this original disclosure.

DETAILED DESCRIPTION

Figure 1:
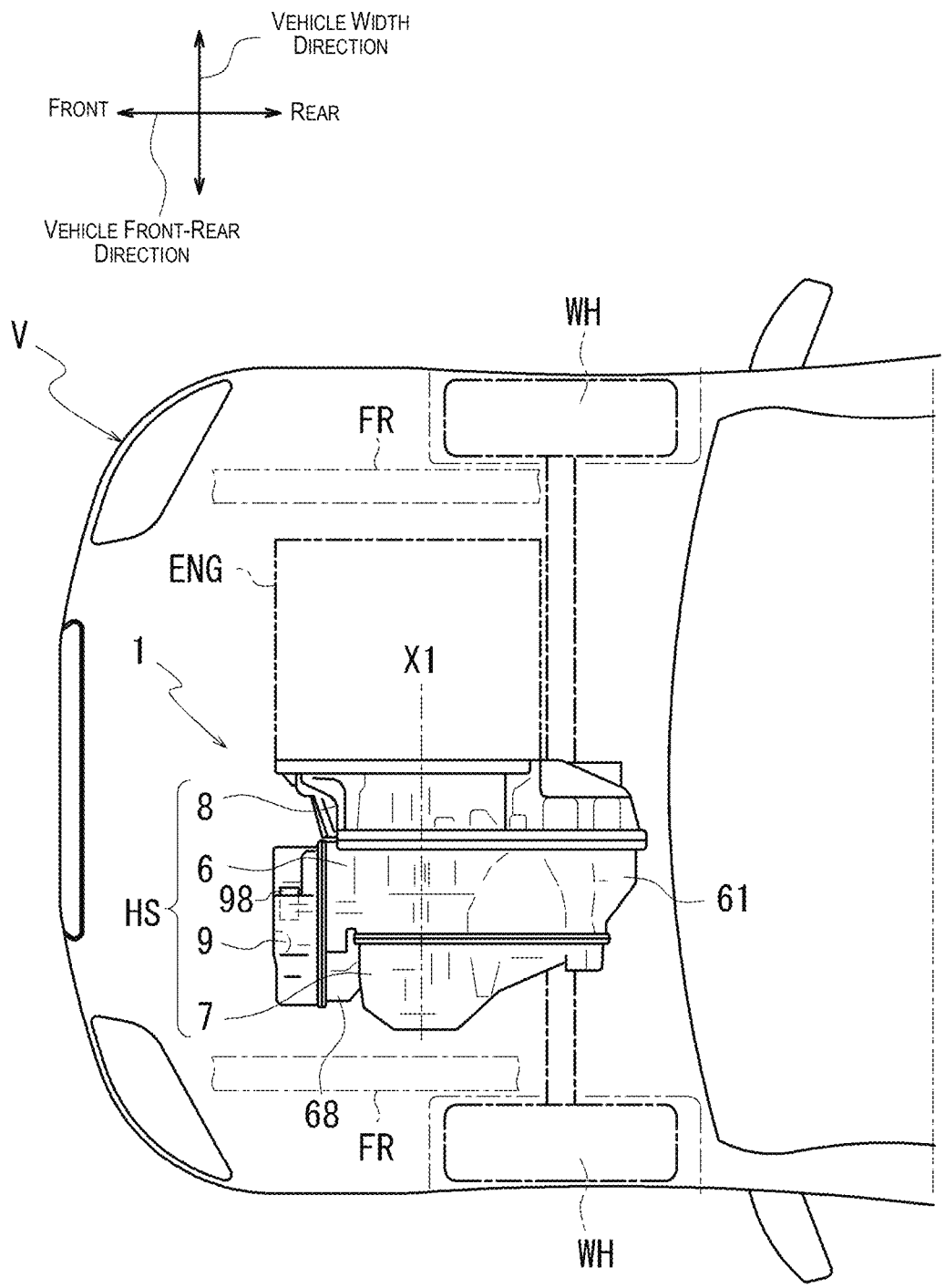
FIG. 1 is a schematic diagram illustrating the arrangement of the power transmission device in a vehicle.

First, definitions of terminology in the present specification will be explained.

A power transmission device is a device having at least a power transmission mechanism, where the power transmission mechanism is, for example, at least one of a gear mechanism, a differential gear mechanism, or a reduction gear mechanism.

In the following embodiment, a case is illustrated in which a power transmission device 1 has a function for transmitting the output rotation of an engine, but the power transmission device 1 need only transmit the output rotation of at least one of an engine or a motor (rotating electrical machine).

"Overlaps as viewed from a prescribed direction" means that a plurality of elements are arranged in a prescribed direction, and means the same as "overlapping in a prescribed direction." "Prescribed direction" is, for example, the axial direction, radial direction, direction of gravity, forward or rearward direction of travel of the vehicle.

If a plurality of elements (parts, sections, etc.) are shown arranged in a prescribed direction in the drawings, it may be assumed that there is text in the description in the specification indicating that the plurality of elements overlap when viewed in the prescribed direction.

"Not overlapping as viewed in a prescribed direction" and "offset when viewed in a prescribed direction" mean that a plurality of elements are not arranged in the prescribed direction, and mean the same as "not overlapping in a prescribed direction" and "offset in a prescribed direction." "Prescribed direction" is, for example, the axial direction, radial direction, direction of gravity, direction of travel of the vehicle (vehicle forward travel direction, vehicle rearward travel direction), etc.

If a plurality of elements (parts, sections, etc.) are shown not arranged in a prescribed direction in the drawings, it may be assumed that there is text in the description in the specification indicating that the plurality of elements do not overlap as viewed in the prescribed direction.

"As viewed from a prescribed direction, a first element (part, section, etc.) is located between a second element (part, section, etc.) and a third element (part, section, etc.)" means that when viewed from the prescribed direction, the first element can be seen between the second element and the third element. The "prescribed direction" is, for example, the axial direction, radial direction, direction of gravity, direction of travel of the vehicle (forward movement direction of the vehicle, rearward movement direction of the vehicle), etc.

For example, if the second element, the first element, and the third element are arranged in that order in the axial direction, then the first element is located between the second element and the third element when viewed from the radial direction. If the first element is shown between the second element and the third element as viewed from a prescribed direction in the drawings, it may be assumed that there is text in the description in the specification describing the first element between the second element and the third element as viewed from the prescribed direction.

When two elements (parts, sections, etc.) overlap as viewed from the axial direction, the two elements are coaxial.

"Axial direction" means the axial direction of the axis of rotation of a part making up the device. "Radial direction" means a direction orthogonally intersecting the axis of rotation of the part making up the device. The part is, for example, a motor, a gear mechanism, a differential gear mechanism, or the like.

"Upright" with reference to the control valve means that in the case of a control valve having a basic configuration with a separation plate sandwiched between valve bodies, the valve bodies of the control valve are stacked in the horizontal line direction based on the state of installation of the power transmission device in the vehicle. The "horizontal line direction" here does not mean the horizontal line direction in the strict sense, but also includes cases in which the direction of stacking is at an angle to the horizontal line.

Further, "upright" with respect to the control valve means that the control valve is arranged with the plurality of pressure regulating valves inside the control valve aligned in the direction of a vertical line VL based on the state of installation of the power transmission device in the vehicle.

"The plurality of pressure regulating valves aligned in the direction of a vertical line VL" means that the regulating valves inside the control valve are arranged spaced out in the direction of the vertical line VL In this case, the plurality of pressure regulating valves need not be strictly arranged in single file in the direction of the vertical line VL.

For example, if the plurality of valve bodies are stacked to form the control valve, the following is possible. Namely, the plurality of pressure regulating valves may be arranged in the direction of the vertical line VL with shifted positions in the direction of stacking of the valve bodies in the upright control valve.

Further, as viewed from the axial direction of the valve bodies provided on the pressure regulating valves (the direction of forward and backward movement), the plurality of pressure regulating valves need not be arranged with gaps in between in the direction of the vertical line VL.

As viewed from the axial direction of the valve bodies provided with the pressure regulating valves (the direction of forward and backward movement), the plurality of pressure regulating valves need not be adjacent in the direction of the vertical line VL.

Hence, if, for example, the pressure regulating valves arranged in the direction of the vertical line VL are arranged with shifted positions in the stacking direction (horizontal line direction) of the valve bodies, then cases are also included in which, as viewed from the stacking direction, the pressure regulating valves that are adjacent in the direction of the vertical line VL are provided in a partially overlapping positional relationship.

Further, that the control valve is "upright" means that the plurality of pressure regulating valves inside the control valve are arranged in the direction of movement of the valve bodies (spool valves) provided in the pressure regulating valves aligned in the horizontal line direction.

The direction of movement of the valve bodies (spool valves) in this case is not limited to the horizontal line direction in the strict sense. The direction of movement of the valve bodies (spool valves) in this case is a direction along an axis of rotation X of the power transmission device. In this case, the direction of the axis of rotation X and the sliding direction of the valve bodies (spool valves) are the same.

An embodiment of the present disclosure is described below.

FIG. 1 is a schematic diagram illustrating the arrangement of a power transmission device 1 in a vehicle V.

Figure 2:
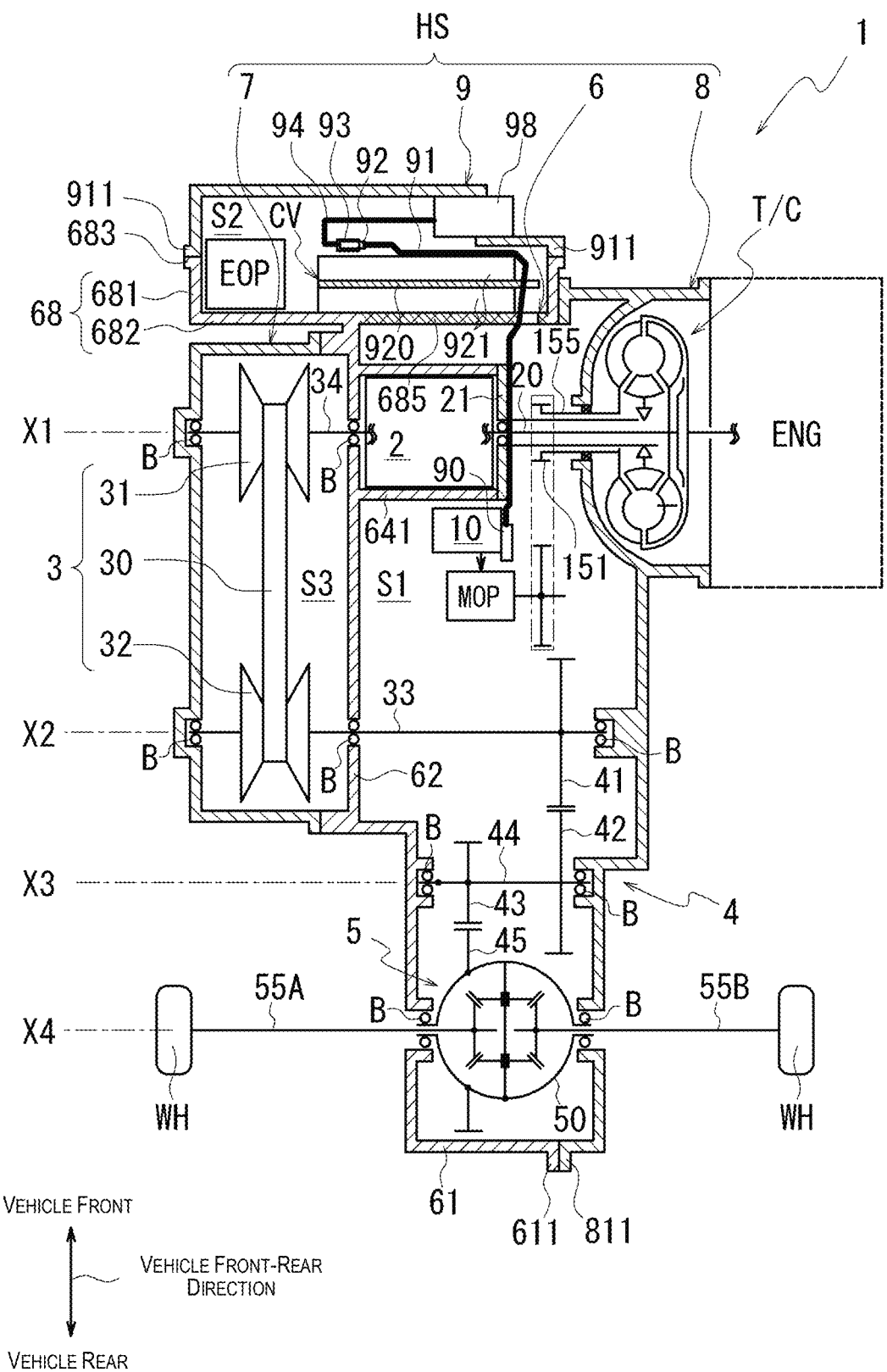
FIG. 2 is a schematic diagram illustrating a general configuration of the power transmission device.

FIG. 2 is a schematic diagram illustrating a general configuration of the power transmission device 1.

As shown in FIG. 1, the power transmission device 1 in the front of the vehicle V is arranged between left and right frames FR, FR. A housing HS of the power transmission device 1 is configured by a case 6, a first cover 7, a second cover 8, and a third cover 9.

As shown in FIG. 2, the interior of the housing HS accommodates a torque converter T/C, a forward-reverse switching mechanism 2, a variator 3, a reduction mechanism 4, a differential drive device 5, an electronic oil pump EOP, a mechanical oil pump MOP, a control valve CV, etc.

In the power transmission device 1, output rotation of an engine ENG (the drive source) is input into the forward-reverse switching mechanism 2 via the torque converter T/C.

The rotation input to the forward-reverse switching mechanism 2 is forward rotation or reverse rotation and is input to a primary pulley 31 of the variator 3.

In the variator 3, changing the winding radius of a belt 30 in the primary pulley 31 and a secondary pulley 32 causes the rotation input to the primary pulley 31 to be shifted at a desired gear ratio and output by an output shaft 33 of the secondary pulley 32.

Output rotation of the secondary pulley 32 is input via the reduction mechanism 4 into the differential drive mechanism 5 (differential gear mechanism) and is then transmitted to drive wheels WH, WH via left and right drive shafts 55A, 55B.

The reduction mechanism 4 has an output gear 41, an idler gear 42, a reduction gear 43, and a final gear 45.

The output gear 41 rotates together with the output shaft 33 of the secondary pulley 32.

The idler gear 42 meshes with the output gear 41 in a manner allowing transmission of rotation. The idler gear 42 is spline-fitted to an idler shaft 44. The idler gear 42 rotates together with the idler shaft 44. The idler shaft 44 is provided with the reduction gear 43 that has a smaller radius than the idler gear 42. The reduction gear 43 meshes with the final gear 45 that is fixed to the outer circumference of a differential case 50 of the differential device 5 in a manner allowing transmission of rotation.

In the power transmission device 1, the forward-reverse switching mechanism 2, the torque converter T/C, and the output shaft of the engine ENG are arranged coaxially (concentrically) along an axis of rotation X1 (first axis) of the primary pulley 31.

The output shaft 33 of the secondary pulley 32 and the output gear 41 are arranged coaxially along an axis of rotation X2 (second axis) of the secondary pulley 32.

The idler gear 42 and the reduction gear 43 are arranged coaxially along a common axis of rotation X3 (third shaft).

The final gear 45 and the drive shafts 55A, 55B are arranged coaxially on a common axis of rotation X4 (fourth shaft: output shaft of the power transmission mechanism). In the power transmission device 1, the axes of rotation X1-X4 are set to have a positional relationship parallel to each other. In the following, these axes of rotation X1-X4 may, as needed, be referred to as the axis of rotation X of the power transmission device 1 (power transmission mechanism).

Figure 3:
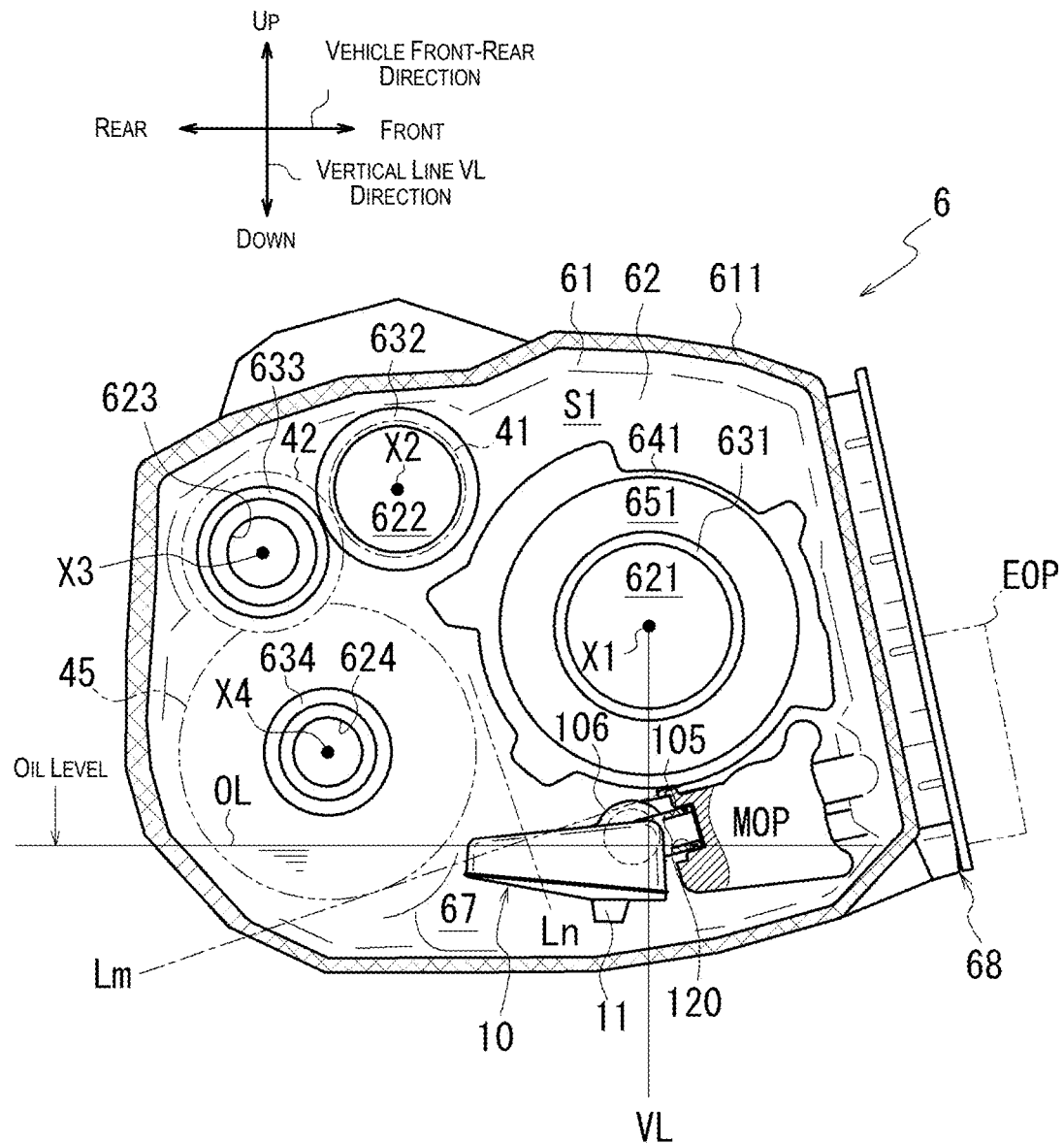
FIG. 3 is a diagram of a case as viewed from the second cover side.

FIG. 3 is a diagram of the case 6 as viewed from the second cover 8 side.

As shown in FIG. 3, the case 6 has a cylindrical circumferential wall section 61 and a partition section 62. A housing section 68 which forms a second chamber S2, which will be described below, is attached to the outer circumference of the circumferential wall section 61 on the side toward the front of the vehicle.

The partition section 62 is provided within a range cutting across the axes of rotation (axis of rotation X1-axis of rotation X4) of the power transmission mechanism.

As shown in FIG. 2, the partition section 62 divides the space inside the circumferential wall section 61 in two in the direction of the axis of rotation X1. One side of the partition section 62 in the direction of the axis of rotation X1 is a first chamber S1, and the other side is a third chamber S3.

The first chamber S1 accommodates the forward-reverse switching mechanism 2, the reduction mechanism 4, and the differential mechanism 5. The third chamber S3 houses the variator 3.

In the case 6, an opening on the first chamber S1 side is sealed by the second cover 8 (torque converter cover). An opening on the third chamber S3 side is sealed by the first cover 7 (side cover).

In the case 6, the oil used for the operation of the power transmission device 1 or lubrication of component elements of the power transmission device 1 is collected below the space between the first cover 7 and the second cover 8 (the first chamber S1 and the third chamber S3).

As shown in FIG. 3, the end surface of the case 6 facing the second cover 8 side (toward the viewer) is a joining section 611 with the second cover 8. The joining section 611 is a flanged section that surrounds the entire circumference of the opening on the second cover 8 side of the partition section 62. A joining section 811 (see FIG. 2) on the second cover 8 side is joined to the entire circumference of the joining section 611. The case 6 and the second cover 8 are connected by bolts, not shown, to join the joining sections 611, 811 together. The opening of the case 6 is thus held in a state sealed by the second cover 8, forming the closed first chamber S1.

As shown in FIG. 3, in the case 6, the partition section 62 is located inside the joining section 611.

The partition section 62 of the case 6 is provided in a direction essentially orthogonal to the axes of rotation (axes of rotation X1 to X4). Through-holes 621, 622, 624 and a support hole 623 are formed in the partition section 62.

The through-hole 621 is formed around the axis of rotation X1. A cylindrical support wall section 631 surrounding the through-hole 621 and a circumferential wall section 641 surrounding the outer circumference of the cylindrical support wall section 631 with a space in between are provided in the surface of the partition section 62 facing the first chamber S1 (toward the viewer). The cylindrical support wall section 631 and the circumferential wall section 641 project toward the viewer in FIG. 3 (toward the second cover 8 in FIG. 2).

A region 651 between the support wall section 631 and the circumferential wall section 641 is a cylindrical space accommodating a piston (not shown) of the forward-reverse switching mechanism 2, friction plates (forward clutch, reverse brake), etc.

An input shaft 34 (see FIG. 2) of the primary pulley 31 is rotatably supported on the inner circumference of the cylindrical support wall section 631 via bearings B.

As shown in FIG. 3, the through-hole 622 is formed around the axis of rotation X2.

In the power transmission device 1 mounted in the vehicle V, the axis of rotation X2 is positioned diagonally above toward the rear of the vehicle as viewed from the axis of rotation X1.

A cylindrical support wall section 632 that surrounds the through-hole 622 is provided in the surface of the partition section 62 facing the first chamber S1 (toward the viewer). The inner circumference of the support wall section 632 supports the output shaft 33 (see FIG. 2) of the secondary pulley 32 rotatably via the bearings B.

As shown in FIG. 3, the support hole 623 is a closed-bottom hole formed around the axis of rotation X3.

In the power transmission device 1 mounted in the vehicle V, the axis of rotation X3 is positioned diagonally above toward the rear of the vehicle as viewed from the axis of rotation X1 and diagonally below toward the rear of the vehicle as viewed from the axis of rotation X2.

A cylindrical support wall section 633 that surrounds the support hole 623 is provided in the surface of the partition section 62 facing the first chamber S1 (toward the viewer). The inner circumference of the support wall section 633 rotatably supports one end of the idler shaft 44 of the reduction mechanism 4 (see FIG. 2) via the bearings B.

As shown in FIG. 3, the through-hole 624 is formed around the axis of rotation X4.

In the power transmission device 1 mounted in the vehicle V, the axis of rotation X4 is positioned diagonally below toward the rear of the vehicle as viewed from the axis of rotation X1, diagonally below toward the rear of the vehicle as viewed from the axis of rotation X2, and diagonally below toward the front of the vehicle as viewed from the axis of rotation X3.

A cylindrical support wall section 634 that surrounds the through-hole 624 is provided in the surface of the partition section 62 facing the first chamber S1 (toward the viewer). The differential case 50 (see FIG. 2) of the differential device 5 is rotatably supported in the inner circumference of the support wall section 634 via the bearings B.

As shown in FIG. 2, the final gear 45 that forms a ring shape when viewed from the direction of the axis of rotation X4 is fixed to the outer circumference of the differential case 50. The final gear 45 rotates around the axis of rotation X4 together with the differential case 50.

In the case 6 shown in FIG. 3, the region below the arcuate circumferential wall section 641 and farther toward the front of the vehicle than the final gear 45 serves as an oil collection section 67.

The oil collection section 67 is a closed-end space with an opening facing the second cover 8 side (toward the viewer in FIG. 3).

The oil collection section 67 in the first chamber S1 is the lower region inside the case 6 in the vertical line VL direction, based on the installation state of the power transmission device 1 in the vehicle.

A strainer 10 supported by the partition section 62 is arranged within the oil collection section 67 with an intake port 11 facing downward.

As viewed from the direction of the axis of rotation X of the power transmission device 1, the strainer 10 is disposed between the input shaft (axis of rotation X1) and the output shaft (axis of rotation X4) of the power transmission mechanism.

The strainer 10 is located at the intersection of a tangent line Lm and a line Ln. The tangent line Lm is a straight line connecting the outer circumference of the circumferential wall section 641 and the outer circumference of the final gear 45. The straight line Ln is a line that passes between the circumferential wall section 641 and the final gear 45 and is orthogonal to tangent Lm.

In the power transmission device 1, the region between the circumferential wall section 641 and the final gear 45 tends to be unused dead space. By positioning the strainer 10 toward the upper side in the vertical line VL direction within this dead space, the increase in size of the case 6 in the vertical line VL direction is prevented.

In this embodiment, the oil collection section 67 is set in a region within the case 6 where oil OL is always present, even if the height position of the oil OL (oil level) fluctuates in the housing HS (case 6) due to acceleration and deceleration during the operation of the vehicle V.

Therefore, by arranging the strainer 10 in the oil collection section 67 with the intake port 11 facing downward, the intake port 11 of the oil OL is submerged in the oil within the oil collection section 67. This helps prevent the occurrence of the drawing in of air when the oil OL in the oil collection section 67 is suctioned into the strainer 10.

As shown in FIG. 3, the input shaft (axis of rotation X1) of the power transmission mechanism is positioned above the output shaft (axis of rotation X4) of the power transmission mechanism. Therefore, as viewed in the vehicle forward direction from the strainer 10, there is space in the vertical line VL direction.

In this embodiment, the mechanical oil pump MOP is positioned toward the front of the vehicle, as viewed from the strainer 10. A connection section 105 of the strainer 10 is connected to a connection port 120 of the mechanical oil pump MOP. When the mechanical oil pump MOP is driven, the oil OL in the oil collection section 67 is suctioned toward the mechanical oil pump MOP side through the strainer 10.

The intake port 11 of the strainer 10 is located toward the position of the mechanical oil pump MOP (toward the right of the figure) in the lower part of the strainer 10. The intake port 11 is positioned near the rear of the vehicle in the vertical line VL passing through the input shaft (axis of rotation X1) of the power transmission mechanism.

Note that the strainer 10 has a connection section 106. The connection section 106 is provided in a direction orthogonal to the connection section 105. The connection section 106 extends away from the viewer in FIG. 3. The connection section 106 connects to an oil path inside the partition section 62. The connection section 106 communicates with the electric oil pump EOP via an oil path (not shown) inside the partition section 62.

The connection section 105 of the strainer 10 is supported by the mechanical oil pump MOP that is fixed to the partition section 62. The connection section 106 of the strainer 10 is supported by the partition section 62.

Thus, the strainer 10 is supported at two points, the mechanical oil pump MOP and the partition section 62.

As shown in FIG. 2, on the side facing the front of the vehicle, the case 6 is provided with a housing section 68.

The housing section 68 is provided with an opening facing the front of the vehicle. The housing section 68 is arranged in the direction along the axis of rotation X1. As viewed from the radial direction of the axis of rotation X1, the housing section 68 is formed having a range in the direction of the axis of rotation X1 extending from the region of the circumferential wall section 61 of the case 6 to the side of the first cover 7.

Approximately half of the area of the bottom wall section 682 of the housing section 68 is on the engine ENG side, integrated with the circumferential wall section 61. The opposing approximate half of the bottom wall section 682 is provided creating a gap with the outer circumference of the first cover 7, extending from the circumferential wall section 61.

In the following description, the region of the bottom wall section 682 that is integrated with the circumferential wall section 61 (the region shared with the circumferential wall section 61) is, as needed, referred to as a dividing wall 685. When referred to as the dividing wall 685, this indicates the region of the bottom wall section 682 shown in FIG. 6 that overlaps the circumferential wall section 61 of the case 6.

Note that in FIG. 2, crosshatching is applied to the region of the dividing wall 685 to clarify the area of the dividing wall 685.

Figure 4:
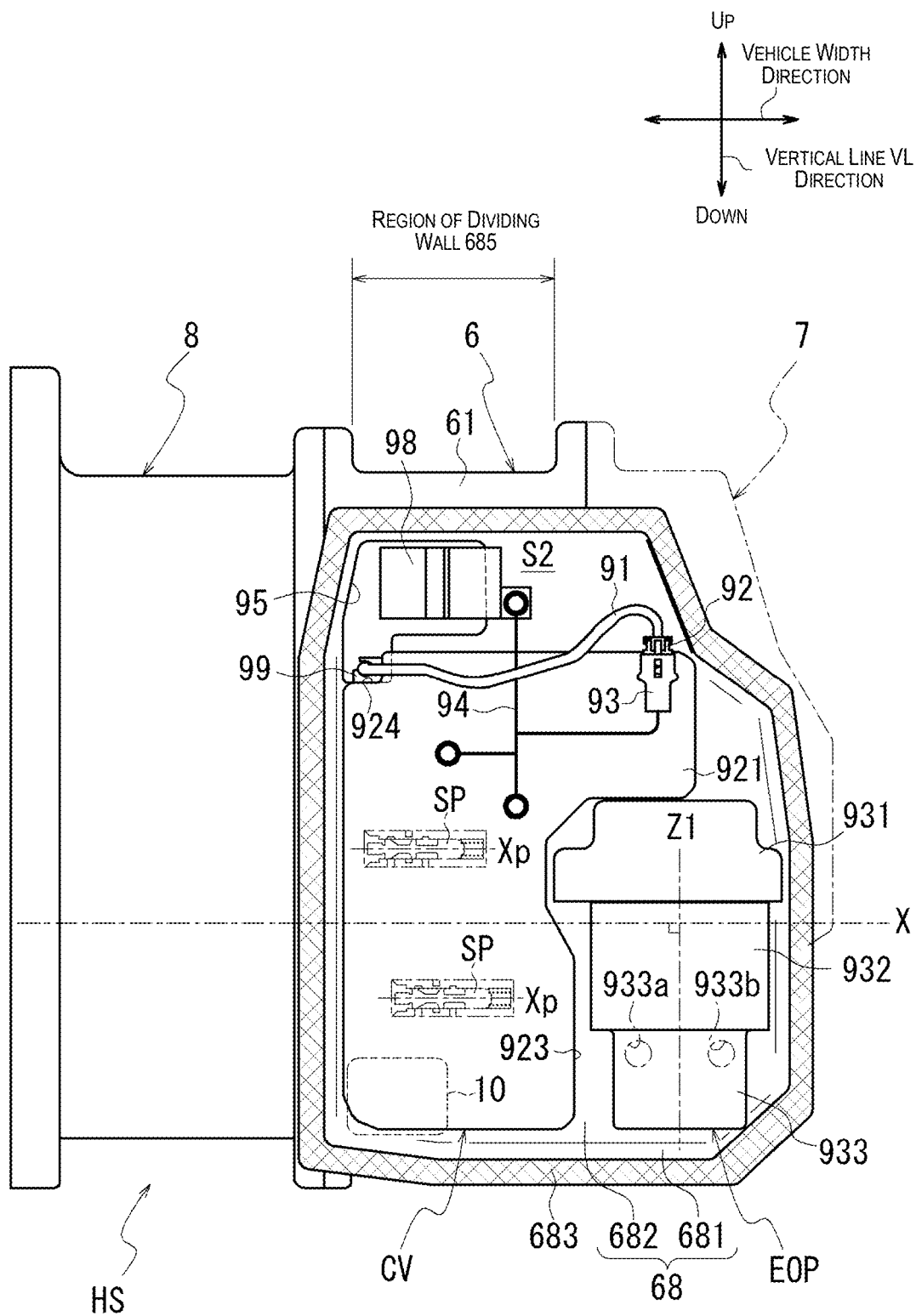
FIG. 4 is a diagram of the housing as viewed from the front of the vehicle.

FIG. 4 is a schematic diagram showing the housing HS as viewed from the front of the vehicle.

As shown in FIG. 4, as viewed from the front of the vehicle, the housing section 68 has a surrounding wall 681 that encompasses the entire outer circumference of the bottom wall section 682. The end surface of the surrounding wall 681 toward the viewer serves as a joining section 683 with the third cover 9. The joining section 683 is a flanged section that surrounds the entire circumference of the opening on the third cover 9 side of the surrounding wall 681.

As shown in FIG. 2, the joining section 683 is joined with the entire circumference of the joining section 911 on the third cover 9 side. The housing section 68 and the third cover 9 are connected by bolts, not shown, to join the joining sections 683, 911 together. The opening of the housing section 68 is thus held in a state sealed by the third cover 9, forming the closed second chamber S2.

The control valve CV and the electric oil pump EOP are housed within the second chamber S2.

As shown in FIG. 2, the control valve CV has a basic configuration in which a separation plate 920 is sandwiched between valve bodies 921, 921. Inside the control valve CV, an oil pressure control circuit (not shown) is formed. The oil pressure control circuit is provided with pressure regulating valves (spool valves) that operate based on a solenoid driven by commands from a control device (not shown) and the signal pressure generated by the solenoid.

As shown in FIG. 4, in the second chamber S2, the control valve CV is upright, so that that the stacking direction of the valve bodies 921, 921 is aligned in the front-rear direction of the vehicle (the direction toward and away from the viewer in the figure).

In the second chamber S2, the control valve CV is upright so as to satisfy the following conditions. (a) A plurality of pressure regulating valves SP (spool valves) inside the control valve CV are aligned in the vertical line VL direction (vertical direction) based on the state of installation of the power transmission device 1 in the vehicle V, and (b) the direction of advancement and retraction Xp of the pressure regulating valves SP (spool valves) is along the horizontal line direction.

Consequently, the direction of advancement and retraction of the spool valves inside the control valve is oriented along the horizontal line direction. Additionally, the spool valves inside the control valve are offset in the vertical line VL direction. Thus, the second chamber S2 is prevented from increasing in size in the vehicle front-rear direction, while ensuring that the movement of the spool valves is not hindered.

As shown in FIG. 4, the control valve CV, as viewed from the front of the vehicle, forms an approximate L-shape provided with a cut-out 923 in the essentially rectangular valve body 921. The cut-out 923 in the second chamber S2 is located under the region overlapping the first cover 7, as viewed from the front of the vehicle.

The electric oil pump EOP is housed within the cut-out 923 as viewed from the front of the vehicle.

The electric oil pump EOP has a basic configuration in which a control unit 931, a motor unit 932, and a pump unit 933 are aligned in series along the axis of rotation Z1 of the motor.

The electric oil pump EOP is provided oriented so that the axis of rotation Z1 is orthogonal to the axis of rotation X of the power transmission device 1. In this state, the pump unit 933 is located at the very bottom of the second chamber S2. An intake port 933a and a discharge port 933b of the pump unit 933 are positioned toward the boundary with the motor unit 932. The intake port 933a of the pump unit 933 is connected to the strainer 10 via an oil path within the case 6. The discharge port 933b of the pump unit 933 is connected to the control valve CV via another oil path within the case 6.

The control valve CV is housed in the second chamber S2, separate from the first chamber S1 (see FIG. 3) where the strainer 10 is located. In FIG. 4, as viewed from the front of the vehicle, the strainer 10 is positioned at the lower side of the second chamber S2 away from the viewer (refer to dashed lines in the figure).

In this embodiment, by positioning the pump unit 933 of the electric oil pump EOP at the bottom of the second chamber S2, the vertical line VL positions of the intake port 933a of the pump unit 933 and the strainer 10 are brought closer together. This ensures that the length of the oil path connecting the strainer 10 and the intake port 933a of the electric oil pump EOP is shortest.

The upper side of the control valve CV extends to above the electric oil pump EOP. As viewed from the vertical line VL direction (the direction of the axis of rotation Z1 of the electric oil pump EOP), the electric oil pump EOP is in a positional relationship overlapping the control valve CV.

The oil pressure control circuit inside the control valve CV regulates the operating oil pressure of the power transmission mechanism (such as the torque converter T/C) based on the oil pressure generated by the oil pump.

The power transmission device 1 is provided with one each of the mechanical oil pump MOP and the electric oil pump EOP as oil pumps. These oil pumps suction, pressurize, and supply the oil OL collected in the lower part of the housing HS to the oil pressure control circuit inside the control valve CV. At least one of these oil pumps is driven during the operation of the vehicle in which the power transmission device 1 is mounted. In the following description, when no distinction is made between the mechanical oil pump MOP and the electric oil pump EOP, the term oil pump OP will be used.

In this embodiment, the strainer 10 is shared by the electric oil pump EOP and the mechanical oil pump MOP.

When the mechanical oil pump MOP is driven, the oil OL collected in the oil collection section 67 in the lower part of the housing HS is suctioned through the strainer 10 into the mechanical oil pump MOP. The oil OL suctioned by the mechanical oil pump MOP is then pressurized and supplied to the control valve CV through an oil path within the case.

When the electric oil pump EOP is driven, the oil OL collected in the oil collection section 67 in the lower part of the housing HS is suctioned through the strainer 10 and an oil path within the case toward the electric oil pump EOP. The oil OL suctioned by the electric oil pump EOP is then pressurized and supplied to the control valve CV.

In the second chamber S2, an opening 95 is provided at the topmost part of the region of the dividing wall 685.

The opening 95 connects the second chamber S2 with the first chamber S1.

Figure 5:
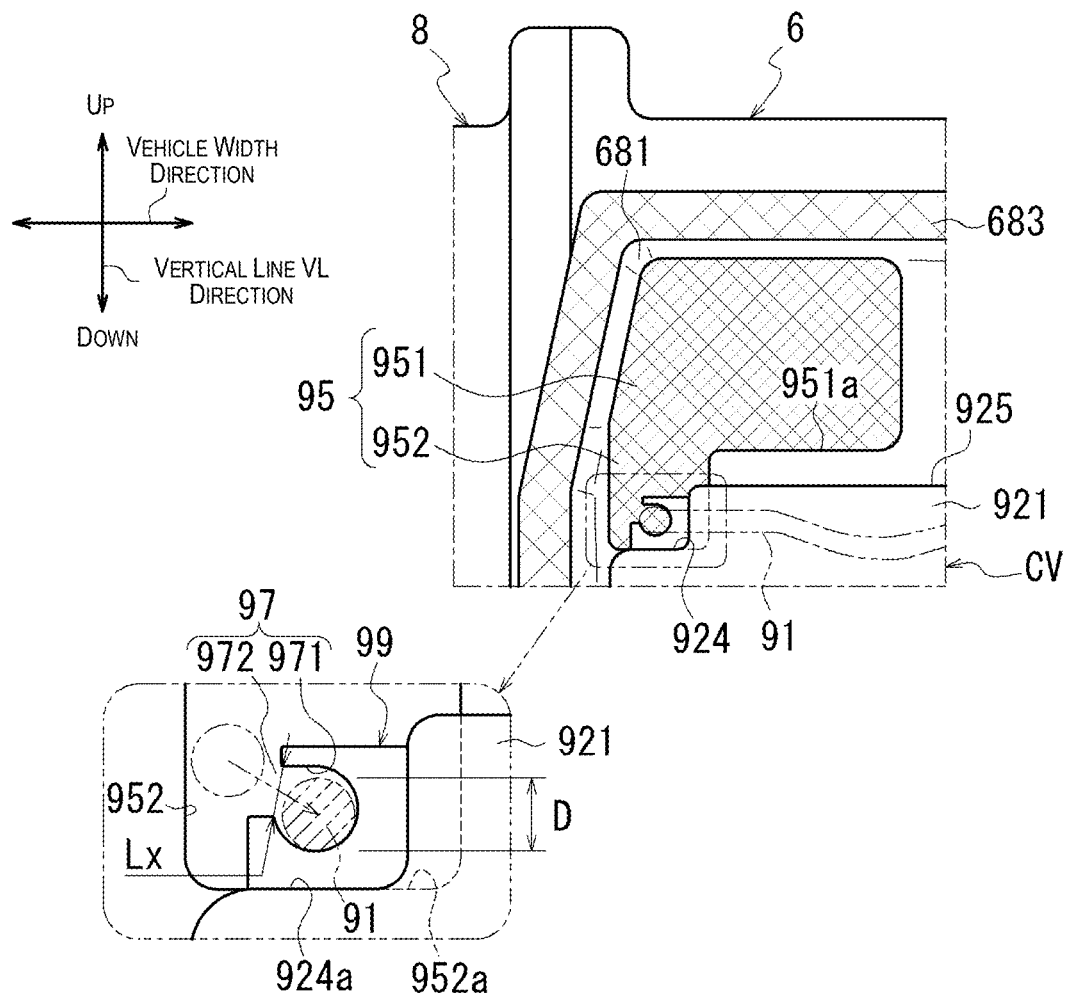
FIG. 5 is an enlarged view around an opening that communicates between the first chamber and the second chamber.
Figure 6:
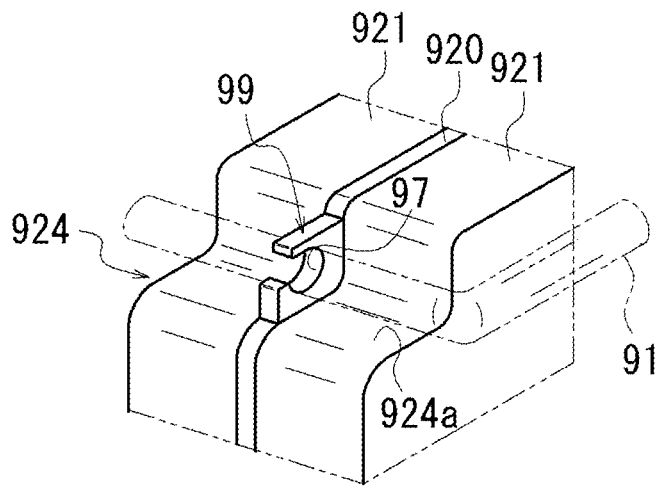
FIG. 6 is a perspective view illustrating an engaging section in the control unit.

FIG. 5 is an enlarged view around the opening 95 that connects the first chamber S1 and the second chamber S2. FIG. 6 is a perspective view illustrating an engaging section 99 in the control valve CV. In FIG. 5, to clarify the location of the opening 95, the area of the opening 95 is shown with crosshatching similar to that used for the joining section 683.

As shown in FIG. 5, as viewed from the front of the vehicle (toward the viewer), the opening 95 forms an approximate L-shape. The opening 95 has a first region 951 and a second region 952. The first region 951 extends in the vehicle width direction (left-right direction in the figure) inside the surrounding wall 681. A lower edge 951a of the first region 951 is positioned above an upper edge 925 of the control valve CV.

The second region 952 extends downward from the area of the first region 951 on the side of the second cover 8 (left side of the figure) toward the control valve CV.

In the valve body 921 of the control valve CV, a recess 924 is provided in the upper part toward the second cover 8.

The second region 952 of the opening 95 is provided extending up to the recess 924 of the control valve CV.

The lower edge 952a of the second region 952 is positioned approximately at the same height as the upper edge 924a of the recess 924 of the control valve CV.

As viewed from the front of the vehicle, the second region 952 and the engaging section 99 on the side of the control valve CV are in an overlapping positional relationship.

As noted above, the control valve CV has a basic structure configuration in which the separation plate 920 is sandwiched between the valve bodies 921, 921 (see FIG. 6).

In this embodiment, the recess 924 is provided in the upper corners of the valve bodies 921, 921, exposing the corner area of the upper side of the separation plate 920 within the recess 924. The exposed area within the recess 924 of the separation plate 920 is used as an engaging section 99 for the electrical wire 91 extending from a temperature sensor 90 (see FIG. 7).

The engaging section 99 has a notch 97. The notch 97 has a first region 971 and a second region 972. The first region 971 is an essentially circular area with an inner diameter slightly larger than a diameter D of an electrical wire 91. The second region 972 is a cut-out area at the upper part of the first region 971 on the side of the second cover 8 (left side of the figure).

The second region 972 is formed with a gap Lx slightly smaller than the diameter D of the electrical wire 91. The gap Lx is set to a width allowing the electrical wire 91, which extends toward the viewer through the opening 95 (second region 952), to be inserted from the second region 972 section into the interior of the first region 971.

In this embodiment, of the wire spanning the first chamber S1 and the second chamber S2, the engaging section 99 is provided to hold the area of the electrical wire 91 that is located within the second chamber S2.

Figure 7:
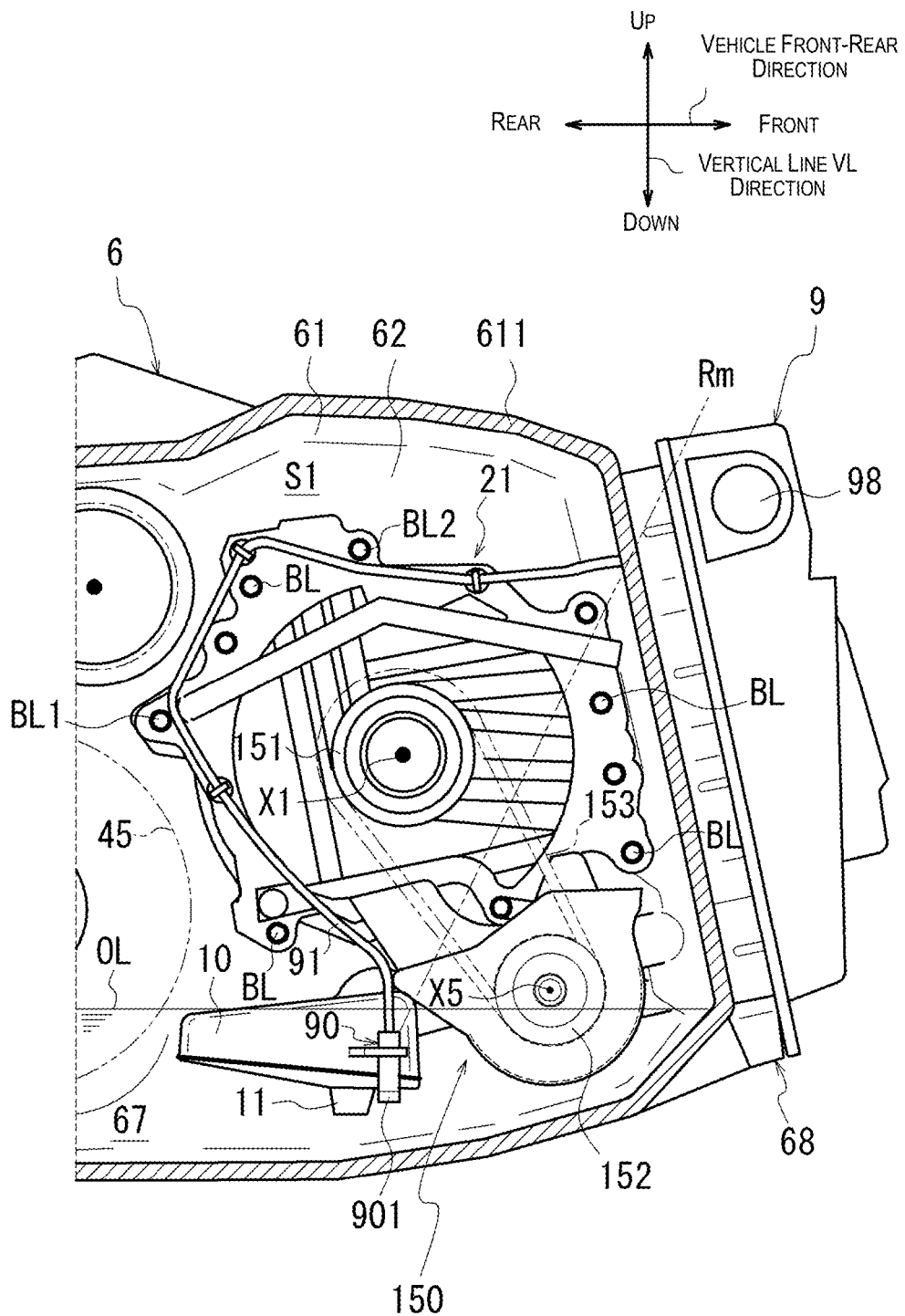
FIG. 7 is a diagram illustrating the routing of the electrical wire in the first chamber.
Figure 8:
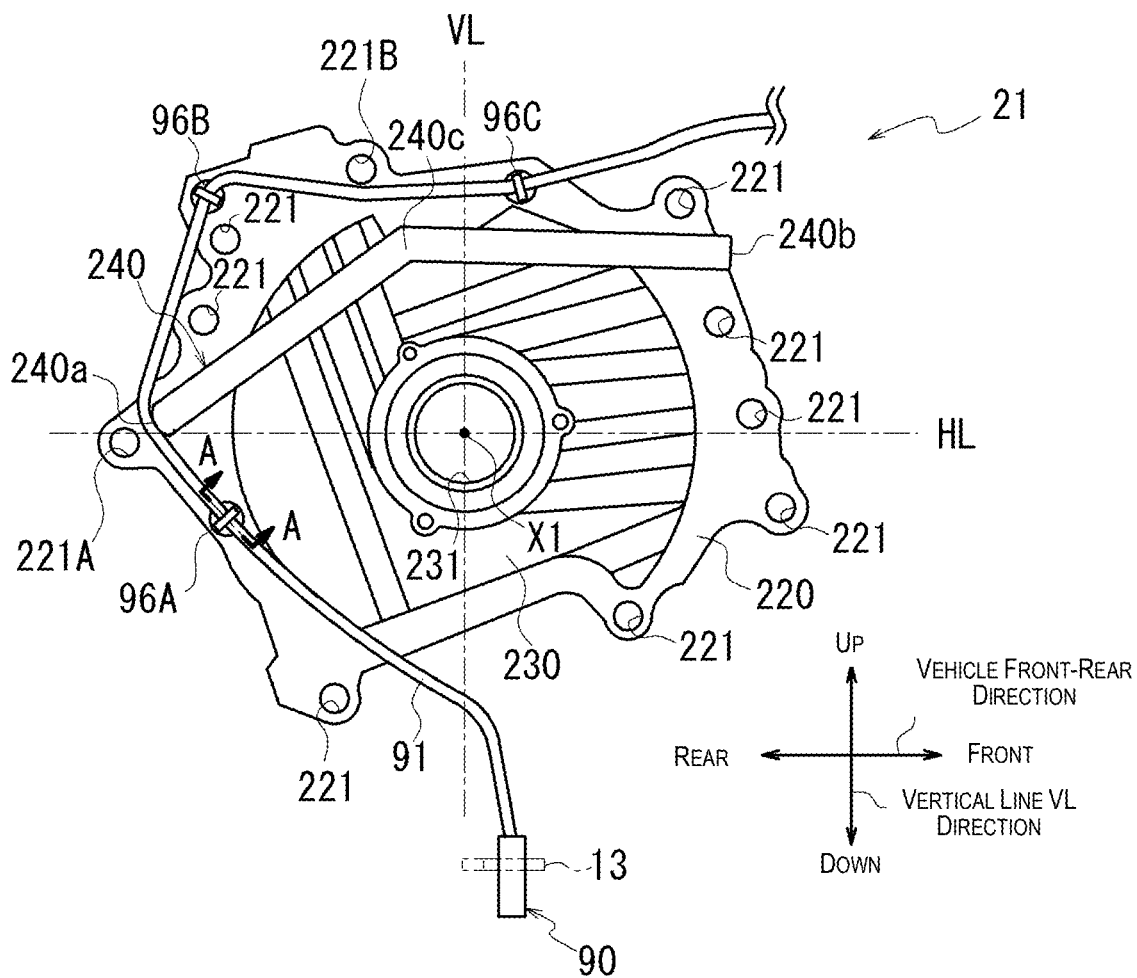
FIG. 8 is a diagram illustrating a dummy cover that supports the electrical wire.
Figure 9:
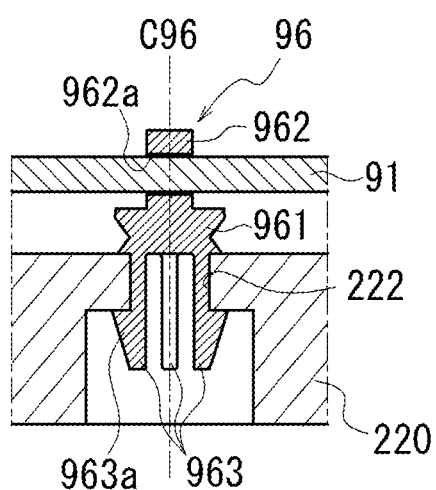
FIG. 9 is a diagram illustrating support of the electrical wire by a mounting fixture.

FIG. 7 is a diagram illustrating the routing of the electrical wire 91 in the first chamber S1. FIG. 8 is a diagram illustrating a dummy cover 21 that supports the electrical wire 91. FIG. 9 is a diagram illustrating the support of the electrical wire 91 by a fixing device 96.

As shown in FIGS. 3 and 7, in the power transmission device 1, the mechanical oil pump MOP, which is driven by a rotation transmission mechanism 150, is located in the housing section 68 (on the right side of the figure) as viewed from the strainer 10.

As shown in FIG. 7, the rotation transmission mechanism 150 consists of a drive sprocket 151, a driven sprocket 152, and a chain 153.

As shown in FIG. 2, the drive sprocket 151 rotates about the axis of rotation X1 with the rotational drive force input through an impeller sleeve 155 of the torque converter T/C.

The impeller sleeve 155 is externally fitted to the input shaft 20 of the forward-reverse switching mechanism 2. The input shaft 20 is rotatably supported by a dummy cover 21 that seals the opening of the circumferential wall section 641.

The drive sprocket 151 and the impeller sleeve 155 are rotatably supported on the input shaft 20 of the forward-reverse switching mechanism 2.

As shown in FIG. 7, the rotation input to the drive sprocket 151 is transmitted to the driven sprocket 152 via the chain 153. The driven sprocket 152 rotates about the axis of rotation X5 with the transmitted rotation. When the driven sprocket 152 rotates, the rotary shaft of the mechanical oil pump MOP, which is connected to the driven sprocket 152, rotates, thereby driving the mechanical oil pump MOP.

This results in the oil OL collected in the lower part of the case 6 being suctioned through the strainer 10.

The strainer 10 is provided with the temperature sensor 90 (sensor, oil temperature sensor) for measuring the temperature of the oil OL being suctioned into the strainer 10. The temperature sensor 90 is attached to the side surface of the strainer 10. A sensor part 901 at the tip of the temperature sensor 90 is positioned next to the intake port 11 of the strainer 10. The temperature sensor 90 is positioned such that at least the sensor part 901 is submerged in the oil OL collected in the oil collection section 67.

One end of the electrical wire 91 is connected to the sensor part 901 of the temperature sensor 90. As shown in FIG. 2, the other end of the electrical wire 91 is connected to a connector section 92 (see FIG. 4), which connects to a mating connector 93. The electrical wire 91 electrically connects the temperature sensor 90 and the connector section 92. The output signal from the sensor part 901 is output through the electrical wire 91 to an external processing device (e.g., a control device of the power transmission device 1).

As shown in FIG. 4, in this embodiment, the connector section 92 is connected to the mating connector 93 within the second chamber S2, which houses the control valve CV. The mating connector 93 is connected to a control device, not shown, and also connected to an external terminal 98 through wiring 94.

As shown in FIG. 7, the terminal 98 is exposed on the surface of the third cover 9. A vehicle-side connector is connected to this terminal 98.

The temperature sensor 90 requires that while the sensor part 901 is submerged in oil, the connector section 92 must be connected to the mating connector 93 at a position that is not submerged in oil. Therefore, in this embodiment, the connector section 92 is connected to the mating connector 93 within the second chamber S2, which is divided off from the first chamber S1.

As shown in FIG. 7, in the first chamber S1, the rotation transmission mechanism 150 is located on the side of the second chamber S2 (the side with the housing section 68 where the connector section 92 is located), as viewed from the temperature sensor 90. A shortest path Rm connecting the temperature sensor 90 and the housing section 68 (the opening 95: see FIG. 10) is crossed by the chain 153 of the rotation transmission mechanism 150 in the vertical line VL direction (vertical direction in the figure).

Therefore, in the power transmission device 1, as viewed from the direction of the axis of rotation X, it is necessary to route the electrical wire 91 extending from the temperature sensor 90 around the rotation transmission mechanism 150.

There are two routing paths for the electrical wire 91, a path 1 that goes around the upper part of the drive sprocket 151, and a path 2 that goes around the lower part of the driven sprocket 152.

However, (a) the temperature sensor 90 attached to the strainer 10 has the sensor part 901 oriented downward, and the electrical wire 91 is drawn from above the temperature sensor 90. (b) On the second chamber S2 side of the rotation transmission mechanism 150 (right side of the figure), the circumferential wall section 61 is closely arranged, leaving little extra space for arranging the electrical wire 91. (c) To avoid interference with surrounding rotating bodies (rotating elements), a holder is required to position the electrical wire 91, but there is little extra space on the second chamber S2 side of the rotation transmission mechanism 150 (right side of the figure) to set a holder.

Therefore, in this embodiment, the electrical wire 91 is routed to goes around the upper part of the drive sprocket 151.

FIG. 8 is a diagram illustrating a dummy cover 21 that supports the electrical wire 91. FIG. 9 is a diagram illustrating the support of the electrical wire 91 by a fixing device 96. In FIG. 8, the vertical line VL and the horizontal line HL, based on the installation state of the power transmission device 1 in the vehicle, are displayed superimposed.

As shown in FIG. 3, in the case 6, the circumferential wall section 641, which forms the housing section for the forward-reverse switching mechanism 2, is provided with an opening facing the viewer (the second cover 8 side). The dummy cover 21 (see FIG. 2) that seals this opening of the circumferential wall section 641 is assembled from the second cover 8 side to the circumferential wall section 641 and is fastened with bolts BL, BL1, BL2 (see FIG. 7).

As shown in FIG. 8, the dummy cover 21 has a circumferential edge section 220 having bolt holes 221, 221A, 221B. The inside of the circumferential edge section 220 is a cover section 230 that covers the side surface of the second cover 8 side (toward the viewer) of the forward-reverse switching mechanism 2. There is an insertion hole 231 at the center of the cover section 230. As shown in FIG. 2, the dummy cover 21 is a plate-like member with a certain thickness in the direction of the axis of rotation X1, and the central insertion hole 231 allows the input shaft 20 of the forward-reverse switching mechanism 2 to pass through in the direction of the axis of rotation X1.

In the circumferential edge section 220, the bolt holes 221 are provided spaced apart around the central axis (the axis of rotation X1). In the circumferential edge section 220, as viewed from the direction of the central axis (the axis of rotation X1), two fixing devices 96A, 96B that support the electrical wire 91 are attached at positions toward the rear side of the vehicle relative to the vertical line VL passing through the center of the insertion hole 231. These fixing devices 96A, 96B are located toward the front of the vehicle (the right side of the figure) relative to the bolt hole 221A, respectively positioned above and below the horizontal line HL passing through the center of the insertion hole 231.

Further, a fixing device 96C is also mounted on the front side of the vehicle relative to the vertical line VL and above the horizontal line HL. Also, in the following, unless the fixing devices 96A, 96B, and 96C are to be individually distinguished, these fixing devices will simply be referred to as fixing device 96.

As shown in FIG. 9, the fixing device 96 has a support 962 having an insertion hole 962a for the electrical wire 91 on one side of a disk part 961, and four legs 963 on the other side. The legs 963 are cantilevered from the disk part 961. The tips of the legs 963 are capable of elastic displacement in the radial direction of a central axis C96 of the fixing device 96.

The fixing device 96 is attached to the circumferential edge section 220 when the legs 963 are inserted into mounting holes 222 provided in the circumferential edge section 220, and a return parts 963a provided on the legs 963 engages the periphery of the mounting holes 222, preventing the legs from becoming detached from the mounting holes 222.

Therefore, by attaching the fixing device 96, through which the electrical wire 91 has passed into the insertion hole 962a, to the mounting hole 222, displacement of the electrical wire 91 near the fixing device 96 is restricted.

As shown in FIG. 8, a rib 240 that contains an oil path is located between the fixing devices 96A and 96B in the vertical line VL direction.

The rib 240 bulges outwardly toward the viewer beyond the circumferential edge section 220 and the cover part 230. The rib 240 is provided in a range that horizontally crosses above the insertion hole 231. A vehicle rear side end 240a of the rib 240 is positioned farther toward the rear of the vehicle than the fixing devices 96A and 96B. The rib 240 is sloped in such a direction that height thereof in the vertical line VL direction decreases from a boundary point 240c toward the rear of the vehicle (left side of the figure).

The bolt hole 221A is located beyond the end 240a side of the rib 240. The end 240a of the rib 240 is rounded. The region between the fixing devices 96A and 96B of the electrical wire 91 presses against this rounded end 240a from the rear side of the vehicle.

The rib 240 is sloped in such a direction that the height thereof in the vertical line VL direction decreases from the boundary point 240c toward an end 240b on the front side of the vehicle.

Fixing device 96C is positioned above the rib 240 on the front side of the vertical line VL.

Fixing devices 96B and 96C are located above the rib 240 in positions at approximately the same height in the vertical line VL direction. The bolt hole 221B is located above these fixing devices 96B and 96C.

A process for installing the temperature sensor 90 in the power transmission device 1 is described below.

As shown in FIG. 2, the temperature sensor 90 is connected to the connector section 92 via the electrical wire 91.

The temperature sensor 90 is installed in the power transmission device 1 from the connector section 92 side.

As shown in FIG. 4, part of the wiring 94 attached to the control valve CV is connected to the mating connector 93. First, the connector section 92 of the electrical wire 91 extending from the temperature sensor 90 is connected to the mating connector 93. Then, the electrical wire 91 extending from the connector section 92 is routed toward the second cover 8 side (left side of the figure) where the opening 95 is located.

As shown in FIGS. 5 and 6, in the control valve CV, the recess 924 is provided in the area overlapping the opening 95 as viewed from the front of the vehicle, and the engaging section 99 of the separation plate 920 is exposed in this recess 924.

The engaging section 99 has a notch 97. The notch 97 has a first region 971 for holding the electrical wire 91 and a second region 972 that enables insertion of the electrical wire 91 into the first region 971.

Therefore, the electrical wire 91 routed from the connector section 92 side is hooked around the corner of the recess 924 of the control valve CV and routed toward the opening 95. The electrical wire 91 is then inserted from the second region 972 into the first region 971 and engaged by the notch 97 of the engaging section 99.

This ensures that in the second chamber S2, the region of the electrical wire 91 between the connector section 92 and the engaging section 99 is disposed without significant slack.

Figure 10:
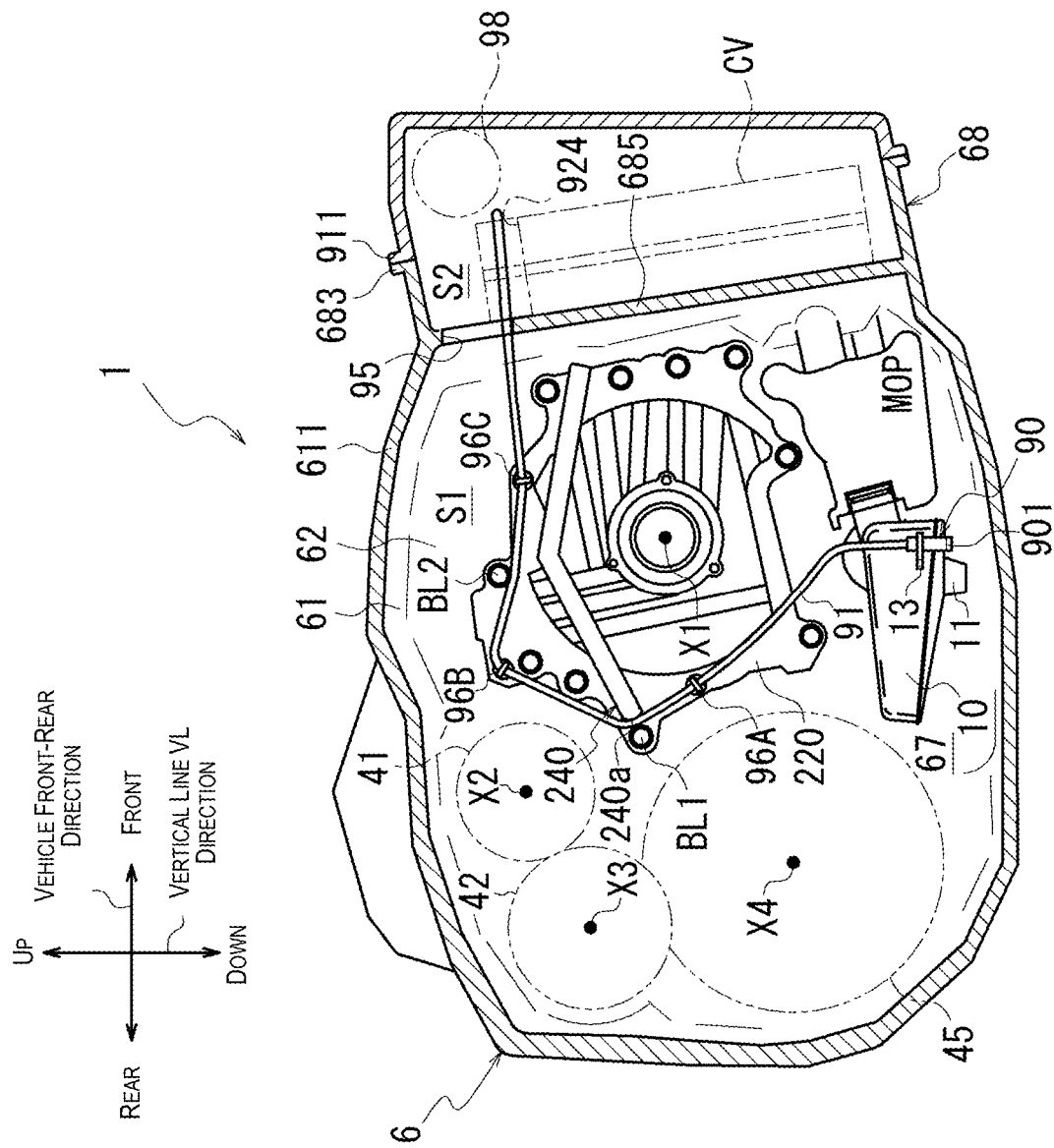
FIG. 10 is a schematic diagram illustrating the routing of the electrical wire in the first chamber.

As shown in FIG. 10, inside the first chamber S1, the electrical wire 91 extending from the opening 95 is fastened at the fixing devices 96A, 96B, 96C by inserting the fixing devices 96A, 96B, 96C, through which the electrical wire 91 has passed, into the mounting holes 222 of the dummy cover 21.

First, the fixing devices 96B and 96C are inserted into the mounting holes 222 of the dummy cover 21, then the region of the electrical wire 91 between the fixing devices 96C and 96B is positioned on the axis of rotation X1 side (lower side of the figure) of the bolt BL2 screwed into the bolt hole 221B of the circumferential edge section 220. This restricts upward displacement of the region of the electrical wire 91 between the fixing devices 96C and 96B by the bolt BL2.

Further, the region of the electrical wire 91 between the fixing devices 96B and 96A is fitted between the end 240a of the rib 240 and the bolt BL1, and then the fixing device 96A is attached to the dummy cover 21 while the electrical wire 91 is pressed against the end 240a of the rib 240 from the rear side of the vehicle.

The temperature sensor 90 is then engaged by an engaging tab 13 attached to the strainer 10, thereby locating the sensor part 901 of the temperature sensor 90 in a position lateral to the intake port 11 and submerged in the oil OL in the oil collection section 67. Here, the engaging tab 13 is supported cantilevered on the side of the strainer 10, and the tip of the engaging tab 13 is capable of elastic displacement away from the side surface (installation surface for the temperature sensor 90) of the strainer 10. This facilitates attachment of the temperature sensor 90 to the side of the strainer 10.

By routing the electrical wire 91 in this manner, the electrical wire 91 extending from the temperature sensor 90 is arranged along the circumferential edge section 220 of the dummy cover 21. Consequently, the electrical wire 91 is arranged in an essentially arcuate configuration along the outer circumference of the drive sprocket 151 supported by the dummy cover 21 (see FIG. 7).

That is, as viewed from the axis of rotation X1, the electrical wire 91 goes around the other axes of rotation X2, X3, X4, and passes through the area between the axis of rotation X, on the one hand, and the other axes X2, X3, X4, on the other, from the lower to the upper part of the case 6.

In this state, the electrical wire 91 is positioned by the fixing devices 96A, 96B, 96C, and also positioned between bolt BL1 and the rib 240.

This strong support by the dummy cover 21 of the electrical wire 91 ensures that the electrical wire 91 does not interfere with surrounding rotating bodies.

Further, the electrical wire 91 drawn from the temperature sensor 90 to the upper part of case 6 passes above the axis of rotation X1 in the vertical line VL direction and is led into the second chamber S2. Finally, the electrical wire 91 connects the connector section 92, located at the opposite end from the temperature sensor 90, to the mating connector 93 in the upper part of the second chamber S2.

The region in the second chamber S2 where the electrical wire 91 is routed does not collect oil OL as in the first chamber S1, ensuring that the oil OL does not interfere with the connection between the connector section 92 and the mating connector 93.

As described above, the power transmission device 1 according to this embodiment includes the following components.

(1) The power transmission device 1 comprises
  a power transmission mechanism having a plurality of rotating elements,
  a housing HS (case) that accommodates the power transmission mechanism,
  a temperature sensor 90 (sensor) positioned in the lower part of the housing HS, and
  an electrical wire 91 that electrically connects the temperature sensor 90 to the connector section 92.

The temperature sensor 90 is positioned in the oil collection section 67 at the bottom of the housing HS.

As viewed from the direction of the axis of rotation X of the power transmission mechanism, the electrical wire 91 is routed through the multiple rotating elements up to the top of the housing HS, thereby positioning the connector section 92 at the top of the housing HS.

With this configuration, the temperature sensor 90 located in the lower part of the housing HS and the connector section 92 positioned in the upper part of the housing HS are connected via the electrical wire 91, which is routed through a plurality of rotating elements.

When the electrical wire 91 is routed around a plurality of rotating elements, the total length of the wire 91 is increased, and the housing HS increases in size to accommodate the routing of the electrical wire 91 around the plurality of elements.

With the aforementioned configuration, it is possible to prevent an increase in the length of the electrical wire 91 while at the same time avoiding an increase in size of the housing HS.

(2) The housing HS has a region 651 that serves as a housing section for the forward-reverse switching mechanism 2 (the first rotating element).

The electrical wire 91 is supported by the dummy cover 21 (cover member), which seals the opening of region 651 and covers the side of the forward-reverse switching mechanism 2.

When the electrical wire 91 is routed through a plurality of rotating elements, it is necessary to support the wire 91 to avoid interference between the rotating elements and the electrical wire 91. By supporting the electrical wire 91 with the dummy cover 21 within the housing HS, which is already present, there is no need to add a separate dedicated part for supporting the wire 91. Adding separate parts could require revising the layout within the housing HS, which could potentially lead to an increase in size of the housing HS. By using the existing dummy cover 21 to support the electrical wire 91, it is possible appropriately to prevent an increase in the parts count and an increase in size of the housing HS.

(3) The housing HS has a first chamber S1 that houses the power transmission mechanism and a second chamber S2 that houses the control valve CV, which is the control unit for the power transmission mechanism.

The temperature sensor 90 is positioned in the oil collection section 67 at the bottom of the first chamber S1.

The connector section 92 is located in the second chamber S2.

The electrical wire 91 is routed between the upper part of the first chamber S1 and the second chamber S2.

With this configuration, the electrical wire 91, which is routed from the bottom to the top of the first chamber S1 through a plurality of rotating elements in the first chamber S1, continues directly to the second chamber S2, and the connector section 92 is located in the second chamber S2.

This allows for a shorter total length of the electrical wire 91 compared to routing the electrical wire 91 around the outside of the plurality of the multiple rotating elements to reach the second chamber S2. Further, the first chamber S1 of the housing HS can be appropriately prevented from increasing in size, as would occur if the electrical wire 91 were routed around the outside of the plurality of rotating elements.

(4) The housing HS includes the partition wall 685 (partition section) that divides the first chamber S1 and the second chamber S2.

The opening 95 that connects the first chamber S1 and the second chamber S2 is provided at the top of the partition wall 685.

With this configuration, the electrical wire 91 can be routed between the second chamber S2 and the upper part of the first chamber S1 without having to make a detour around the outside of the housing HS. If the electrical wire 91 were to be routed around the outside of the housing HS, the additional length of the electrical wire 91 needed to make a detour around the outside of the housing would contribute to an increase in size of the power transmission device 1.

With the above configuration, it is possible appropriately to prevent the enlargement of the power transmission device 1.

(5) The housing HS has a surrounding wall 681 that surrounds the region of the second chamber S2 and a third cover 9 that seals the opening of the surrounding wall 681.

The surrounding wall 681 is provided with an opening facing the front of the vehicle, based on the installation state of the power transmission device 1 in the vehicle.

With this configuration, the second chamber S2, where the connector section 92 is located, opens toward the front of the vehicle. In the vehicle in which the power transmission device 1 is mounted, the vehicle front side of the power transmission device 1 has more extra space than in the width direction of the vehicle. Accessing the second chamber S2 is possible by simply removing the third cover 9, making it easy to perform tasks inside the second chamber S2, such as connecting the connector section 92 of the electrical wire 91 to the mating connector 93 located within the second chamber S2.

(6) The control valve CV has the engaging section 99 for the electrical wire 91 routed between the first chamber S1 and the second chamber S2 through the opening 95.

By providing the engaging section 99 in the control valve CV located in the second chamber S2, the electrical wire 91 disposed in the second chamber S2 can be supported by the control valve CV.

This eliminates the need for a separate component to support the electrical wire 91 in the second chamber S2. Preparing separate components creates the risk of an increase in the size of the second chamber S2 or an increase in the weight of the power transmission device 1, but this configuration favorably prevents such issues.

(7) The control valve CV (control unit) has a basic structure with a separation plate 920 sandwiched between the valve bodies 921, 921.

The engaging section 99 is a notch 97 (cut-out section) provided in the separation plate 920.

With this configuration, providing a notch 97 equivalent to the engaging section in the separation plate 920 makes it possible to provide an engaging section more simply than providing the engaging section in the body of the valve body 921.

(I) The valve bodies 921, 921 have recesses 924 that expose the region of the notch 97 in the separation plate 920.

As viewed from the stacking direction of the valve bodies 921, 921 (toward the front of the vehicle), the recess 924 and the region of the notch 97 are in an overlapping positional relationship.

With this configuration, there is no need to cause the separation plate 920 to project significantly from the valve bodies 921, 921 in order to cause the electrical wire 91 to engage the notch 97 of the separation plate 920. This would cause an increase in size of the separation plate 920. An increase in size of the separation plate 920 would also lead to an increase in size of the housing HS.

By providing the recesses 924, 924 on the sides of the valve bodies 921, 921, it is possible to provide an engaging section for the electrical wire 91 without an increase in the size of the control valve CV, thus favorably preventing an increase in the size of the housing HS.

(8) In the dummy cover 21, the electrical wire 91 is positioned using the rib 240 (a projection) that protrudes from the dummy cover 21 toward the second cover 8, and the bolt BL1 that secures the dummy cover 21 to the housing HS (case 6).

With this configuration, the electrical wire 91 can be gripped between the bolt BL1 and the rib 240, allowing the electric wire 91 to be maintained in a prescribed position on the dummy cover 21.

Further, this setup reduces the number of fixing devices 96 used to support the electrical wire 91 on the dummy cover 21 when routing the electrical wire 91 extending from the temperature sensor 90 and avoiding interference with the components of the rotation transmission mechanism 150.

(9) In the first chamber S1, the input shaft (axis of rotation X1) and the output shaft (axis of rotation X4) of the power transmission mechanism are disposed separately in the vehicle front-rear direction along the horizontal line HL.

Within the first chamber S1, as viewed from the direction of the axis of rotation X of the power transmission device 1, the strainer 10 is positioned between the input shaft (axis of rotation X1) and the output shaft (axis of rotation X2). The temperature sensor 90 is an oil temperature sensor located in the oil collection section 67 at the bottom of the housing HS (first chamber S1), and the temperature sensor 90 is attached to the strainer 10.

With this configuration, the temperature sensor 90 can be attached to the strainer 10 that is submerged in the oil OL in the oil collection section 67, which ensures that the temperature sensor 90 is reliably submerged in the oil OL. This allows the temperature sensor 90 to appropriately measure the temperature of the oil OL in the oil collection section 67. Also, since the strainer 10 is supported at two points, i.e., the mechanical oil pump MOP and the partition section 62, the support stability is good. Attaching the temperature sensor 90 to the stably supported strainer 10 ensures installation stability of the temperature sensor 90.

(II) An engaging tab 13 that is supported in cantilevered fashion by the body of the strainer 10 is provided on the side of the strainer 10 facing the second cover 8.

The temperature sensor 90 is gripped between the body of the strainer 10 and the engaging tab 13.

The temperature sensor 90 is oriented with the sensor part 901 facing downward. As viewed from the second cover 8 side, the sensor part 901 is in a positional relationship overlapping the intake port 11 of the strainer 10.

The electrical wire 91 is connected to the upper part of the temperature sensor 90.

With this configuration, the temperature sensor 90 can easily be attached to the strainer 10. Additionally, since the sensor part 901 is positioned near the oil intake port 11, the temperature of the oil OL that is drawn into the strainer 10 can appropriately be measured.

The oil OL drawn into the strainer 10 is used for driving and lubricating the power transmission mechanism, thus allowing for appropriate detection of the temperature of the oil OL supplied to the power transmission mechanism.

(10) As viewed from the direction of the axis of rotation X of the power transmission device 1, the rotation transmission mechanism 150, in which the chain 153 is wrapped around the drive sprocket 151 and the driven sprocket 152, is provided in the first chamber S1 on the second chamber S2 side as viewed from the strainer 10.

The drive sprocket 151 is rotatably supported by the dummy cover 21.

The electrical wire 91 supported by the dummy cover 21 is routed from the lower to the upper part of the first chamber S1 along the outer circumference of the drive sprocket 151.

With this configuration, the electrical wire 91 extending from the temperature sensor 90 can be routed without interfering with the components of the rotation transmission mechanism 150.

(III) The rotation transmission mechanism 150 consists of a pair of rotating bodies (the drive sprocket 151, the driven sprocket 152) and a chain 153 wrapped around the pair of rotating bodies (the drive sprocket 151, the driven sprocket 152).

The pair of rotating bodies are chain sprockets.

A shortest path Rm connecting the temperature sensor 90 and the housing section 68 (opening 95) is crossed by the chain 153 of the rotation transmission mechanism 150 in the vertical line VL direction.

Since the rotation transmission mechanism 150 is provided to cross the shortest path for routing the electrical wire 91 extending from the temperature sensor 90 toward the second chamber S2, the foregoing configuration makes it possible appropriately to route electrical wire 91 while avoiding interference with the components of the rotation transmission mechanism 150.

Figure 11:
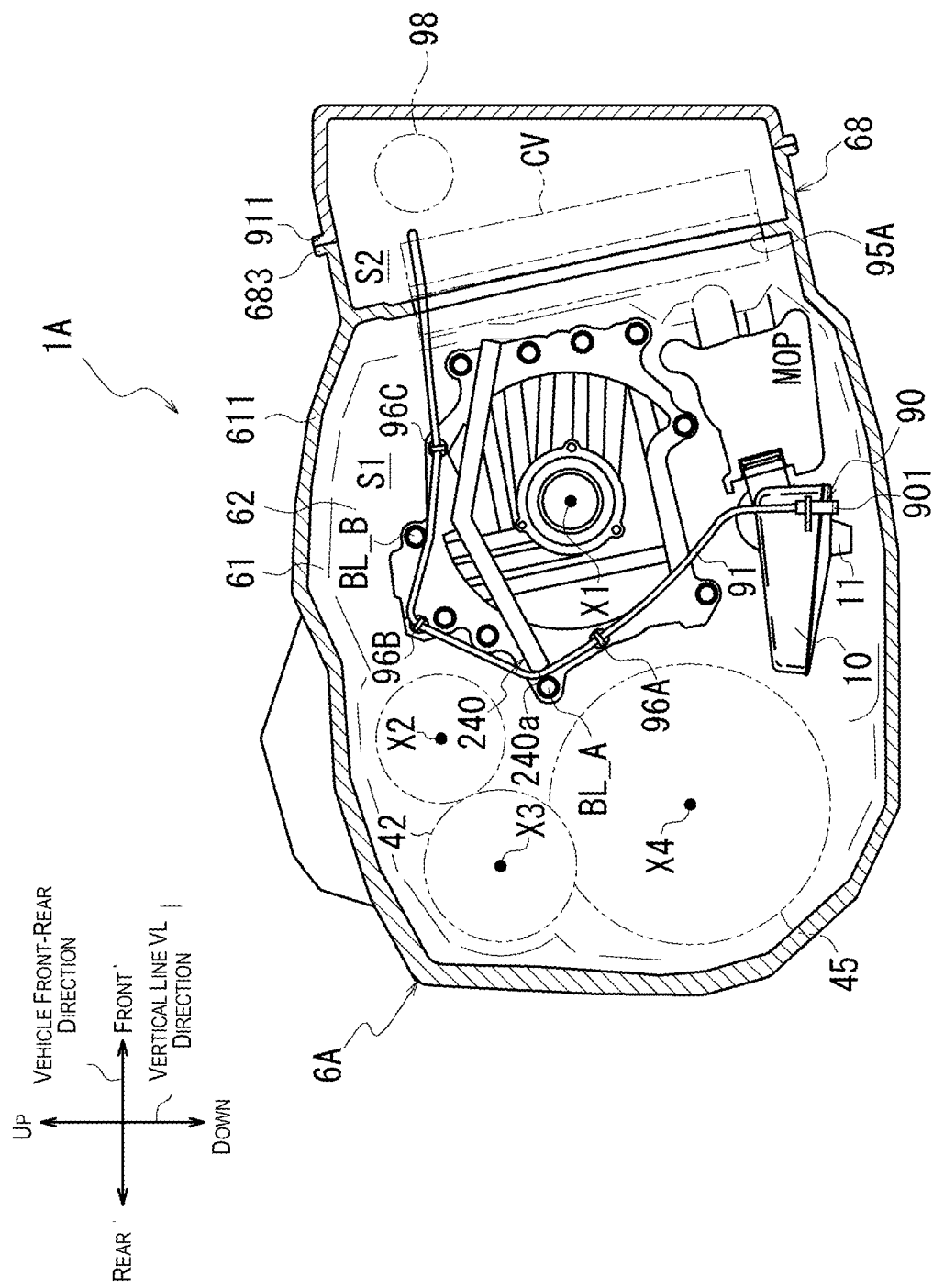
FIG. 11 is a schematic diagram illustrating a power transmission device according to a variant.

FIG. 11 is a schematic diagram illustrating a power transmission device 1A according to a variant.

The foregoing embodiment illustrated a case in which the first chamber S1 housing the strainer 10 and the second chamber S2 housing the control valve CV were completely separated by the partition wall 685. As shown in FIG. 11, a power transmission device 1A is also possible using a modified case 6A in which the first chamber S1 and the second chamber S2 communicate through an opening 95A.

In this power transmission device 1A, the control valve CV is positioned to seal the opening 95A, thereby partitioning the first chamber S1 and the second chamber S2.

Even with the power transmission device 1A configured in this manner, it is possible to prevent the power transmission device 1A from increasing in size, while creating extra space within the housing HS, thus making it possible to improve the layout within the housing HS.

In the foregoing embodiment, an example was given in which the electrical wire 91 extending from the temperature sensor 90 is arranged, but it is also possible, for example, to use the dummy cover 21 or the engaging part 99 as a support for routing the electric wire extending from a sensor (rotation sensor) that detects the rotation of the input shaft 20 of the forward-reverse switching mechanism 2.

Additionally, the dummy cover 21 or the locking part 99 may also be used as a support for routing the electric wire 91 extending from the temperature sensor 90 and the electric wire extending from the rotation sensor bundled together.

In the foregoing embodiment, a case was illustrated in which the power transmission device 1 transmits the rotation of the engine ENG to the drive wheels WH, WH, but it is also possible for the power transmission device 1 to transmit the rotation of at least one of the engine ENG or the motor (rotating electrical machine) to the drive wheels WH, WH. For example, it is possible to use a single-motor, double-clutch power transmission device (in which the motor is arranged between the engine ENG and the power transmission device, a first clutch is disposed between the engine ENG and the motor, and a second clutch is arranged inside the power transmission device 1).

Further, in the foregoing embodiment, a case was illustrated in which the power transmission device 1 has a shifting function, but it is also possible for the power transmission device simply to reduce speed (or increase speed) without a shifting function. If the power transmission device does not have a shifting function and instead reduces and transmits the rotation of the motor to the drive wheels WH, WH, the oil pressure control circuit for supplying the oil OL for cooling the motor and the oil OL for lubricating the reduction mechanism is arranged in the second chamber S2 with the electric oil pump EOP. Further, in the foregoing embodiment, a case was illustrated in which the control unit of the power transmission device 1 was provided with the control valve CV, but if the power transmission device 1 does not have a shifting mechanism and the drive source is a motor (rotating electrical machine) and not the engine ENG, then the control unit may be provided with an inverter or the like for controlling driving of the motor.

Embodiments of the present invention have been described above, but the present invention is not limited only to those aspects shown in the embodiments. The present invention may be appropriately modified within the scope of the technical concept of the invention.

EXPLANATION OF REFERENCE SYMBOLS

1 Power transmission device; 10 Strainer; 11 Intake port; 13 Locking tab; 150 Power transmission mechanism; 151 Drive sprocket (pair of rotating bodies); 152 Driven sprocket (pair of rotating bodies); 2 Forward-reverse switching mechanism (power transmission mechanism: first rotating element); 21 Dummy cover (cover member); 240 Rib (projection); 3 Variator (power transmission mechanism); 4 Reduction mechanism (power transmission mechanism); 5 Differential device (power transmission mechanism); 651 Region (housing section); 681 Surrounding wall; 685 Dividing wall (partition section); 67 Oil OL collection section; 9 Third cover (cover); 90 Temperature sensor (sensor, oil temperature sensor); 91 Electrical wire connector section; 92 Connector section; 920 Separate plate; 921 Valve body; 924 Recess; 95 Opening; 97 Cut-out (notch); 99 Locking section; BL1, BL2, BL Bolts; CV Control valve (control unit); S1 First chamber; S2 Second chamber; T/C Torque converter; and HS Housing (case).

The invention claimed is:

1. A power transmission device, comprising:
a power transmission mechanism having a plurality of rotating elements;
a case that houses the power transmission mechanism;
a sensor disposed at a bottom of the case; and
an electrical wire that electrically connects the sensor and a connector section, wherein
the case has a first chamber that houses the power transmission mechanism and that is defined by a circumferential wall, and a second chamber that houses a control valve of the power transmission mechanism,
the first chamber and the second chamber are adjacent to each other in a vehicle front-rear direction,
the circumferential wall has a housing section on a second chamber side in the vehicle front-rear direction that houses one of the plurality of rotating elements,
the electrical wire is supported by a cover member that seals an opening of the housing section,
the sensor is disposed in a bottom section of the first chamber,
the connector section is disposed in a top section of the second chamber,
the electrical wire is routed to pass between the first chamber and the second chamber, and
as viewed from a direction of an axis of rotation of the power transmission mechanism, the electrical wire is routed from the bottom section of the first chamber to the top section of the second chamber to pass between the plurality of rotating elements in a region opposite the second chamber relative to one of the plurality of rotating elements.

2. The power transmission device according to claim 1, wherein
the case has a partition section that divides the first chamber and the second chamber, and
an opening that connects the first chamber and the second chamber is provided at a top section of the partition section.

3. The power transmission device according to claim 2, wherein
the case has a surrounding wall that surrounds a region of the second chamber, and a cover that seals the opening of the surrounding wall, and
the surrounding wall is provided with an opening facing a front of the vehicle based on an installation state of the power transmission device in the vehicle.

4. The power transmission device according to claim 2, wherein
the control valve is provided with an engaging section for the electrical wire that is routed through the opening and between the first chamber and the second chamber.

5. The power transmission device according to claim 4, wherein
the control valve has a configuration with a separation plate sandwiched between valve bodies, and the engaging section is a notch provided on the separation plate.

6. The power transmission device according to claim 1, wherein
in the cover member, the electrical wire is positioned using a projection on the cover member and a bolt that fastens the cover member to the case.

7. The power transmission device according to claim 1, wherein
in the first chamber, an input shaft of the power transmission mechanism and an output shaft of the power transmission mechanism are spaced apart in a horizontal direction,
in the first chamber, as viewed from a direction of an axis of rotation of the power transmission device, a strainer is disposed between the input shaft and the output shaft,
the sensor is an oil temperature sensor disposed in an oil collection section at the bottom section of the first chamber, and
the oil temperature sensor is attached to the strainer disposed in the oil collection section.

8. The power transmission device according to claim 7, wherein
as viewed from the direction of the axis of rotation of the power transmission device, in the first chamber, a rotation transmission mechanism in which a chain is wrapped around a pair of rotating bodies is provided on the second chamber side as viewed from the strainer,
one of the pair of rotating bodies is rotatably supported by the cover member, and
the electrical wire supported on the cover member is routed from the bottom section to a top section of the first chamber along an outer circumference of the one of the pair of rotating bodies.

* * * * *